United States Patent [19]
Bjurling et al.

[11] 3,929,367
[45] Dec. 30, 1975

[54] MEANS FOR LOCKING A GRIPPING MEMBER OF A PAIR OF GRIPPING TONGS AGAINST ROTATION

[75] Inventors: Per Olof Bjurling; Sven-Eric Juhlin, both of Gustavsberg, Sweden

[73] Assignee: AB Gustavsbergs Fabriker, Gustavsberg, Sweden

[22] Filed: Mar. 4, 1975

[21] Appl. No.: 555,285

Related U.S. Application Data

[63] Continuation of Ser. No. 362,777, May 22, 1973, abandoned.

[30] Foreign Application Priority Data
June 1, 1972   Sweden................................ 7193/72

[52] U.S. Cl................. 294/99 R; 294/100; 294/116
[51] Int. Cl.²........................ B25J 1/00; B25B 3/00
[58] Field of Search...... 294/16, 19 R, 20, 33, 99 R, 294/100, 104, 115, 116; 81/58.2, 58.3, 58.4; 279/1 F, 37, 38, 50, 51, 58, 59; 403/359, 364

[56] References Cited
UNITED STATES PATENTS

| | | | |
|---|---|---|---|
| 339,875 | 4/1886 | Geary | 81/58.3 |
| 437,647 | 9/1890 | Franklin | 294/100 UX |
| 1,299,764 | 4/1919 | Normoyle | 81/58.3 |
| 2,786,223 | 3/1957 | Ziskind | 294/100 X |
| 3,576,343 | 4/1971 | Juhlin et al. | 294/100 |

*Primary Examiner*—Evon C. Blunk
*Assistant Examiner*—Johnny D. Cherry
*Attorney, Agent, or Firm*—Pierce, Scheffler & Parker

[57] ABSTRACT

The invention concerns an improvement of the means for locking the gripping member of a pair of gripping tongs against rotation described in the U.S. Pat. No. 3,576,343, said improvement consisting in that the chuck, into which the gripping member is drawn for closing the jaws of the tongs around the object to be seized, is axially displaceable on a pin projecting forwards from a locking member, the end faces of the chuck and of the locking member facing each other being provided with axially projecting coupling teeth to produce a claw coupling engagement between the coupling member and the chuck when the gripping members are drawn into the chuck. A resilient member between the pin, on which the chuck is displaceable, and a flange in the chuck is provided for returning the claw coupling to the disengaged position when the operating mechanism of the gripping member is released.

2 Claims, 3 Drawing Figures

MEANS FOR LOCKING A GRIPPING MEMBER OF A PAIR OF GRIPPING TONGS AGAINST ROTATION

This is a continuation of application Ser. No. 362,777 filed May 22, 1973 now abandoned.

The present invention relates to means for locking a gripping member of a pair of gripping tongs against rotation, wherein the jaws of the tongs are moved towards each other for seizing an object by drawing the gripping member into a conical chuck by means of the operating mechanism of the tongs.

The locking means are an improvement of the locking means described and shown in the U.S. Pat. No. 3,576,343 concerning a pair of gripping tongs. In the gripping tongs described the gripping member has a journal having external keys or splines which upon operation for gripping are moved into a locking member provided inwardly with keyways or corresponding splines, whereby the gripping member is maintained fixedly onto the journal. These locking means, however, are dependent on the dimensions of the object seized by the gripping member, the splines on the journal, when gripping a large object, engaging only a very little portion of the locking member, so that the gripping member is not securely locked, while a surer engagement is obtained when gripping an object of small dimensions. It is obvious that the conditions would be greatly improved if an equal security of locking could be obtained for both small and large dimensions of the seized object. This is now obtained according to the present invention which is essentially characterized in that the chuck is axially displaceable on a pin projecting forward from a locking member, and in that the opposed and abutting end faces of the chuck and the locking member are provided each with an annular row of coupling teeth forming claw coupling members.

A specific embodiment of the locking means according to the invention will now be described by way of example with reference to the accompanying drawing, in which FIG. 1 shows an axial section through the portion of the gripping tongs including the invention;

Figure 1:
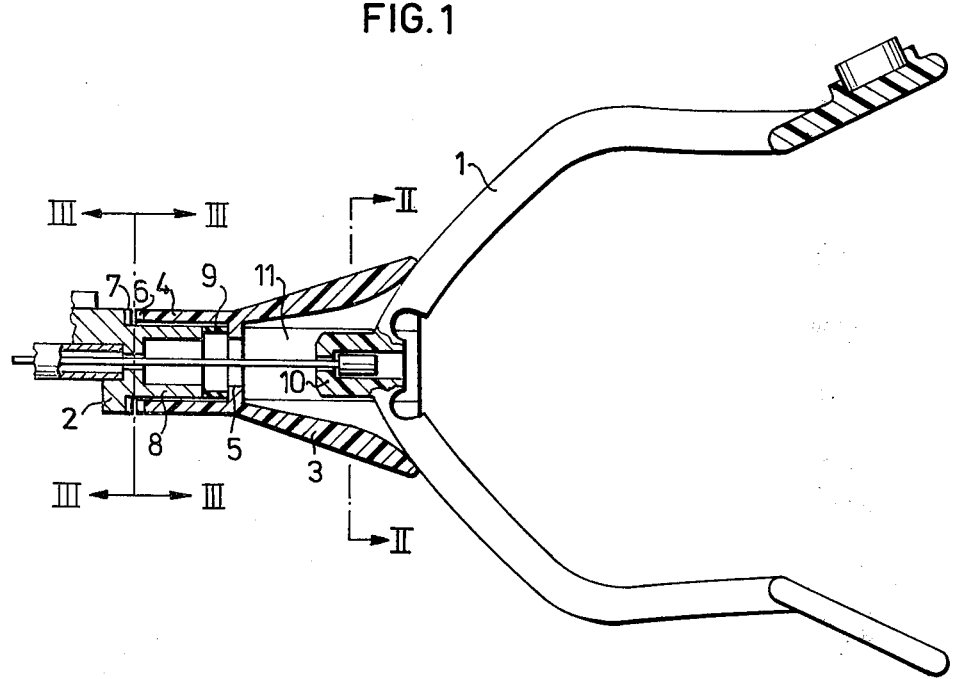
Figure 2:
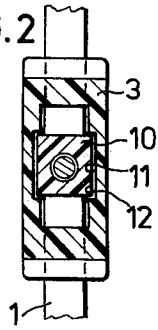
FIG. 2 shows a cross section taken along line II—II in FIG. 1.
Figure 3:
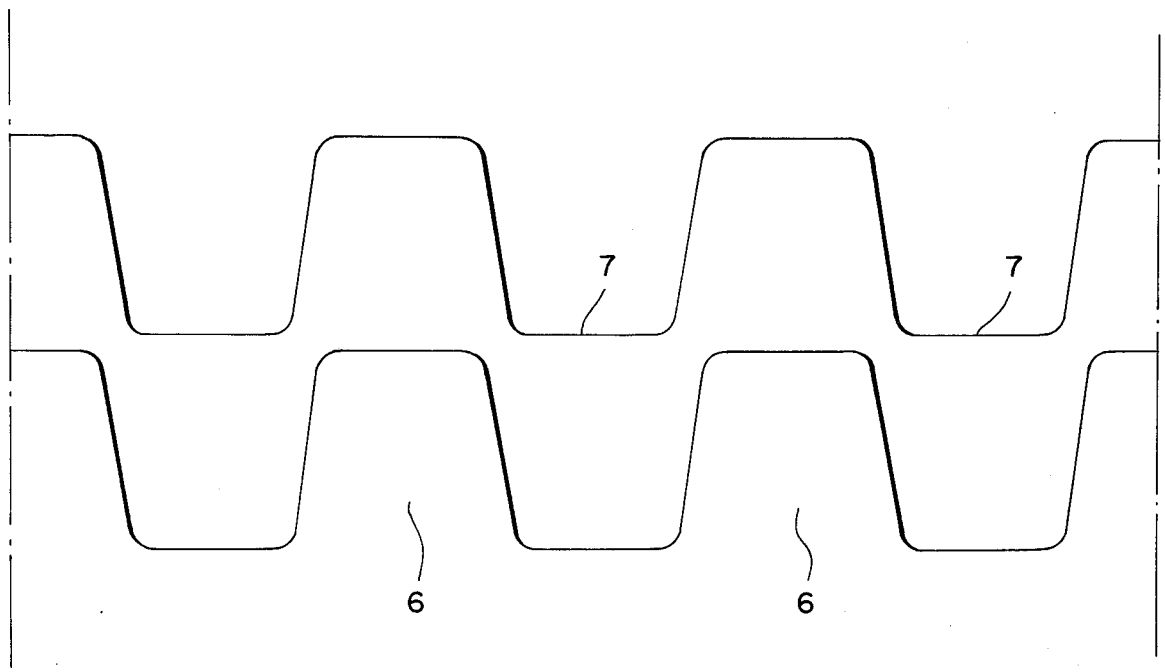
FIG. 3 is a partial view, in larger scale, on both sides of a line III—III of FIG. 1 showing cooperating rows of coupling teeth 6,7 spread apart on a plane in order to show their outline.

The gripping tongs which are only partially shown in FIG. 1, have a gripping member 1 and a cooperating locking member 2. A chuck 3 has a hub 4 facing the locking member and has a cylindrical bore extending to an inward flange 5, said flange being traversed by a bore of smaller diameter. The hub 4 has on its end turned away from the gripping member an annular row of coupling teeth 6 of such shape, that they, when tensioning the operating line, always directly engage a corresponding annular row of coupling teeth 7 on a stepped surface between the body of the locking member 2 and a pin 8 projecting therefrom and provided with an axial bore, the chuck 3 being axially displaceably guided on said pin. The coupling teeth 6, 7, are in annular rows, and they have rounded ends and converging sides, as indicated in FIG. 3. Between the end of pin 8 and the flange 5 within the chuck there is a resilient member 9, e.g. a ring of elastic material. The gripping member 1 has a hub 10 of square outer cross section, of which two opposite sides form guiding surfaces 12 which are slidably guided in two opposite guideways 11 in the inner wall of the chuck, whereby the gripping member 1 can be displaced axially in the chuck 3 while secured against rotation. Otherwise the gripping member is arranged and operated in the same manner as in the above cited patent specification.

The means for locking against rotation obviously comes into operation already at a very little displacement of the gripping member, whereby the chuck 3 is urged against the locking member 2, so that the coupling teeth 6 and 7 engage each other. This position of locking against rotation is maintained and does not prevent a continued operation of the gripping member to the gripping position, in which it seizes the object, even at highly variable sizes of the object. When the chuck 3 is moved to the coupling position, the resilient member 9 is compressed between the flange 5 and the end of the pin 8, said resilient member expanding and releasing the locking when the operating force acting on the gripping member is released.

When lifting heavy objects, for which relatively large torques can be expected, the drag in the line is so strong, that the coupling, which forms the locking means against rotation, is securely locked.

What we claim is:

1. In means for locking a gripping member of a pair of gripping tongs against rotation, wherein the jaws of the tongs are moved towards each other for gripping an object by drawing the gripping member into a conical chuck by means of the operating mechanism of the tongs, a locking member (2) integrated with the gripping tongs being caused to engage a locking hub (4) that is axially displaceable by the gripping member (1), the improvement according to which the gripping member (1) and the chuck (3) are provided with cooperating guiding means (10, 11) adapted to keep the gripping member and the chuck secured against relative rotation during axial displacement into the chuck, said axially displaceable locking hub (4) being integrated with said chuck (3) and provided with coupling members (6) for axially engaging coupling members (7) of the locking member (2), said hub being axially displaceable on a forward projection (8) of said locking member (2) before engagement of the coupling members (6) and (7), said hub being brought into engagement with the locking member (2) during the initial portion of the axial displacement of the gripping member (1) into said chuck (3) whereby continued displacement of the gripping member into the chuck proceeds without any possibility of rotation in relation to the other portion of the gripping tongs.

2. Locking means according to claim 1, in which a resilient member (9) is inserted between locking member (2) and cooperating locking hub (4), said resilient member tending to keep the locking members disengaged.

* * * * *